Oct. 27, 1964     A. G. FISHER     3,154,045
AMPHIBIOUS VEHICLES

Filed Dec. 31, 1962     2 Sheets-Sheet 1

INVENTOR
A.G. FISHER
BY: Fetherstonhaugh & Co.
ATTORNEYS

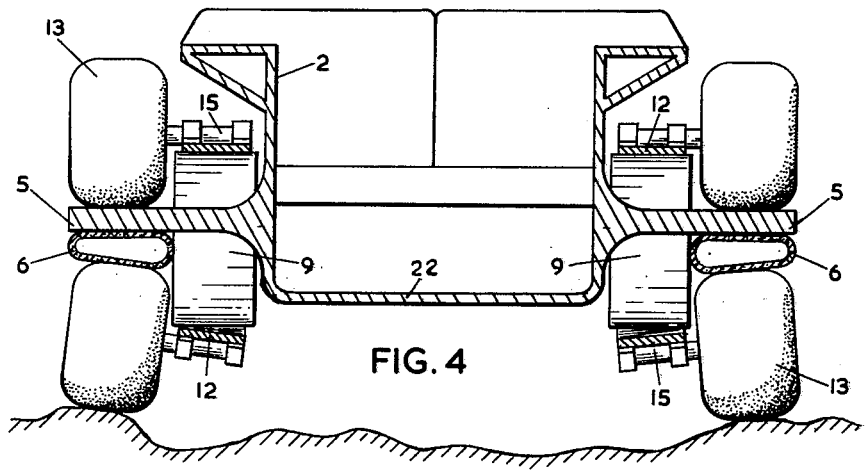
FIG. 4
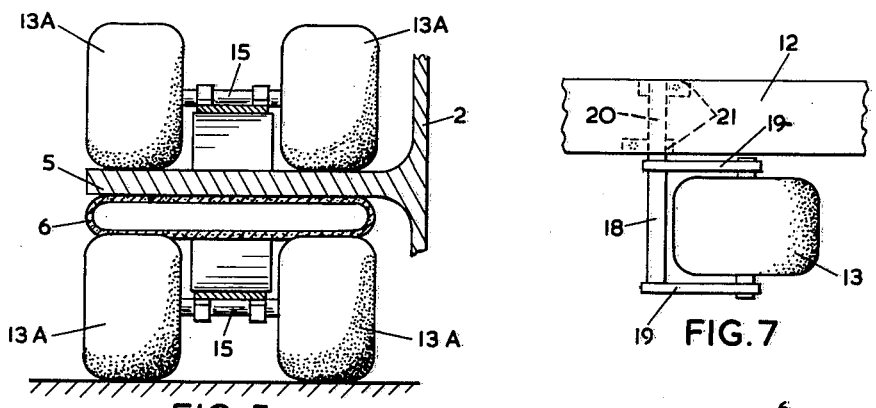
FIG. 5
FIG. 7
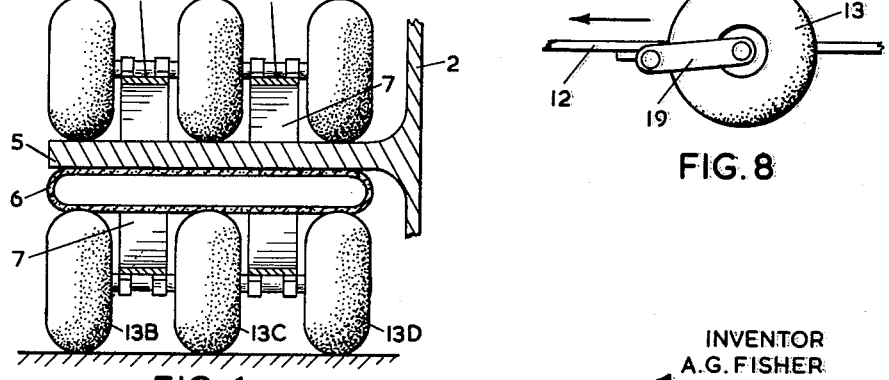
FIG. 6
FIG. 8
INVENTOR
A.G. FISHER
BY: Fetherstonhaugh & Co.
ATTORNEYS

United States Patent Office 3,154,045
Patented Oct. 27, 1964

3,154,045
AMPHIBIOUS VEHICLES
Alfred G. Fisher, 1152 Linbrook Road, Oakville,
Ontario, Canada
Filed Dec. 31, 1962, Ser. No. 248,427
7 Claims. (Cl. 115—1)

My invention relates to improvements in amphibious vehicles of the type comprising a water tight body supported upon two sets of track wheels having their axes arranged for movement along the sides of the body and fitted with low pressure balloon tires for absorption of shock in conforming and yielding to terrain irregularities, the sets of wheels travelling in endless paths lengthwise of the vehicle to provide vehicle support and propulsion.

The object of my invention is to provide such a vehicle wherein the sets of wheels are carried for free rotation upon horizontal axles protruding from the outer side edges of a pair of endless belts extending lengthwise of the sides of the vehicle and mounted upon pulleys actuated by a power unit in the vehicle, the sides of the vehicle carrying longitudinal outboard members so dimensioned and located that the bottom faces of the outboard members rest upon the wheels to support the vehicle, motion of the endless belts causing the wheels to rotate and propel the vehicle as the bottom wheel lays are successively carried into position between the lower faces of the respective outboard members and the ground.

A further and particular object of the invention is to mount the endless belts upon pairs of pulleys positioned adjacently to the ends of the outboard members whereby the belts extend above and below the members, the wheel axles being secured to the outer faces of the belts in spaced relationship and carrying their wheels alongside the outer edges of the belts, whereby under conditions of passage of the vehicle over very rough ground the belts in being capable of lateral deflection permit the wheel axles to swing either upwardly or downwardly and thus permit the tires to laterally swing in rolling over the sides of hillocks, rocks and other obstacles.

Another and important feature of the invention is to provide air inflated cushions extending along the bottoms of the outboard members to constitute their lower faces resting upon the wheels in contact with the ground, the cushions functioning in increasing frictional traction between the wheels and the outboard members, facilitating lateral swinging movement of the tires, and also increasing buoyancy of the vehicle when afloat.

With the foregoing and other objects in view, my invention comprises an amphibious vehicle constructed and arranged all as hereinafter more particularly described and illustrated in the accompanying drawings, in which:

FIG. 4 is an enlarged vertical transverse sectional view through the lower portion of the vehicle body.

FIG. 5 is a vertical fragmentary cross-sectional view of a modification of wheels and endless belt assembly wherein wheels are carried upon both sides of the belt.

FIG. 6 is a schematic view of a further modification wherein sets of three wheels are mounted upon a pair of endless belts, positioned side-by-side.

FIG. 7 is a plan view of a fragmentary portion of an endless belt and to which is attached an alternative wheel mounting permitting vertical swinging movement of the wheel in its path of travel, and FIG. 8 is a side view of the arrangement shown in FIG. 6.

Figure 1:
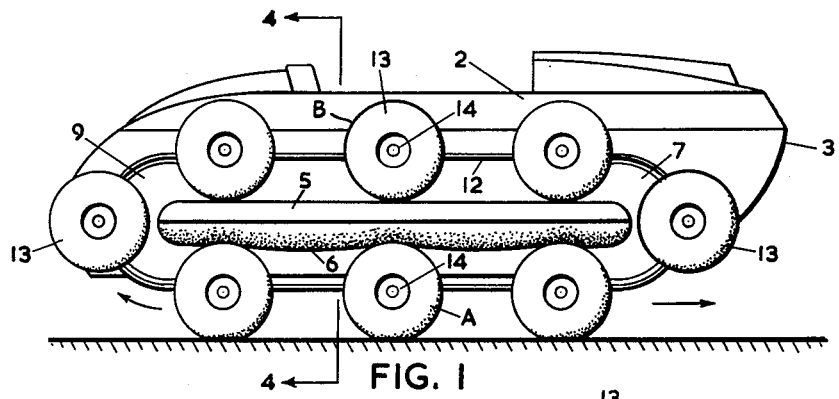
FIG. 1 is a side view of the vehicle resting upon level ground.
Figure 2:
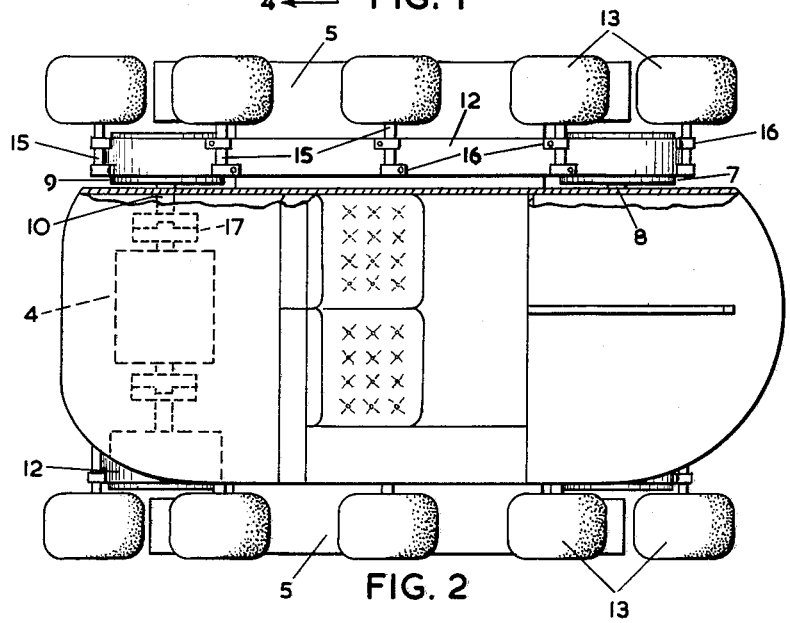
FIG. 2 is a partly broken away plan view of the vehicle.

In the exemplary embodiment of the invention illustrated in the drawings the amphibious vehicle is provided with a water tight body 2 of suitable design and having a front or bow end 3 of a shape best suited for movement through water. The body includes suitable seating accommodation and a compartment housing a power unit 4.

The vehicle body carries longitudinal outboard members 5 protruding from the sides of the body and which may be separate units suitably attached to the body or moulded integrally therewith. Air cushions 6, inflatable through air valves, not shown, are cemented or otherwise attached to the outboard members to cover their bottom surfaces and thus provide the members with pneumatically resilient lower faces, which may carry a tread pattern to enhance their non-skid qualities, if so desired.

The vehicle support and propulsion assemblies, which are similar upon either side of the vehicle body, each comprises a forward pulley 7 freely journalled upon the end of a horizontal shaft 8 protruding from the front end portion of the side of the body and a rear pulley 9 secured upon the end of a horizontal drive shaft 10 driven by the power unit 4. An endless belt 12, which is shown flat in the drawings but which may be of any desirable cross-sectional shape, as for example a V-belt carried upon grooved pulleys, is relatively tautly mounted upon the pulleys 7 and 9. As the pulleys are of the same diameter and are positioned in alignment with the outboard member 6, the upper and lower belt portions extending between the pulleys are substantially parallel to the upper and lower surfaces of their outboard member.

The vehicle wheels 13 comprise low air pressure baglike balloon tires of desired diameter and width and mounted upon suitable hubs 14 freely rotatable upon axle shafts 15. The axle shafts are secured by clamp clips 16 to the outer faces of the endless belts, being positioned laterally of the belts to support the wheels alongside the outer edges of the belts, the shafts being sufficiently spaced to provide clearance between the wheels.

The pulleys 7 and 9 and wheels 13 are so relatively proportioned in diameter and the outboard members 5 and their attached cushions 6 of such a depth and so positions in height upon the vehicle body, that the bottom lay A of wheels extending beneath an outboard member and resting upon the ground, rollingly engages and to a certain degree presses into the bottom faces of the pneumatic cushion 6, the wheels being of such a diameter that the bottom of the vehicle body 2 has desired ground clearance.

Referring to FIG. 4 it will be seen that the outboard members 5 and their attached pneumatic cushions 6 are of sufficient width to completely overlie and underlie the lower lays A and upper lays B of wheels. This figure also illustrates one of the advantages of the pneumatic cushions 6 in permitting the lower lay of wheels pressing against the cushions to laterally swing in adjustment to ground conditions such as hillocks, rocks in swamps or water, dead heads and other such obstacles.

Figure 3:
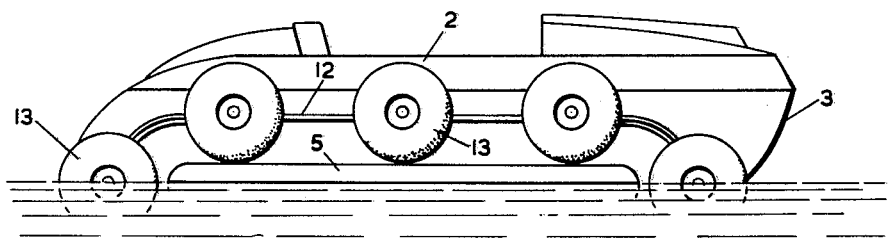
FIG. 3 is a side view of the vehicle afloat.

In propelling the vehicle is a forward direction power is transmitted from the power unit 4 through suitable operator controlled variable speed clutches 17 to rotate the driving rear pulleys 9 in a clockwise direction and whereby the endless belts 12, which are driven by the pulleys 9, pull the bottom wheel lays A rearwardly to produce a forwardly directed opposing thrust force upon the vehicle, forward motion of the vehicle being attained through the frictional engagement of the bottom wheel lays with the bottom surfaces of the outboard member cushions 6, the upper wheel lays B rolling along the top surfaces of the outboard members. It will be apparent that the wheel axles have no function in supporting the vehicle, as the vehicle body outboard members rest upon the tops of the lower lays A of the wheels. Steering is achieved by varying the relative driven speeds of the pulleys 9 through manipulation of the variable speed clutches 17. When the vehicle is afloat, FIG. 3, rotation of the endless belts 12 causes the wheels 13 to act as paddles propelling the vehicle, the air inflated wheel tires and cushions 6 providing great buoyancy. It is to be understood that the vehicle is provided with suitable reverse gearing between the power unit and the driven pulleys to enable the vehicle to be reversed at will.

FIG. 5 illustrates a modified arrangement of the endless belts and wheels to suit requirements in providing vehicles for carrying heavy loads, as for example, construction apparatus and material over swamp land. In the arrangement shown, wheels 13$^A$ are positioned in pairs upon both sides of the endless belts 12, being similarly mounted to the mounting arrangements of the wheels 13, the outboard members 5 and cushions 6 being of greater width to accommodate the pairs of wheels 13$^A$. Referring to FIG. 6, to meet excessively heavy load conditions pairs of pulleys 7 and pairs of pulleys 9 are mounted upon the shafts 8 and 10 in place of the single pulleys 7 and 9 and upon which sets of three wheels 13$^B$, 13$^C$ and 13$^D$ are mounted in alignment, the axles of the wheels 13$^C$ protruding from both sides of the wheels for attachment to both belts.

FIGS. 7 and 8 show an alternative arrangement for mounting the wheels upon the endless belts and which permits the wheels to have a vertical swinging motion in their path of travel. In this arrangement the axles 15 are replaced by yoke members 18 between the arms 19 of which the wheels 13 are mounted for free rotation. The members are formed with pintles 20 turnably mounted within the eyes of cleats 21 attached to the belts, the yokes and wheels being thus vertically swingable relatively to the horizontal planes of the belts and thereby permitting the wheels to individually swing upwardly and thus relieve excessive endless belt tensions should abruptly faced obstacles be encountered.

An added advantage of my construction wherein the flat belts 12 have their bottom lays below the level of the underface 22 of the vehicle body 21 is that in meeting extreme soft terrain conditions such as could be encountered in travelling over mud flats, muskeg or soft deep snow wherein the wheels 13 might sink close to their axles, the lower flat faces of the belts would engage the soft ground surface and thus prevent miring of the under part of the vehicle body, and in their driven motion act as caterpillar tracks in assisting movement of the vehicle.

While I have shown and described particular embodiments and preferred constructions of my invention it will be understood that I may make any changes or alterations within the scope of the invention as I may think advisable, without departing from the spirit of the invention as defined in the appended claims.

What I claimed as my invention is:

1. Means for supporting a vehicle body upon a ground surface and for imparting movement to the body over the ground surface and comprising a pair of driven endless horizontal belts, each belt having a flat face and extending lengthwise of one side of the vehicle body and mounted upon a set of vertical pulleys carried upon the side of the vehicle body, one pulley of each set being actuated by a power unit in the vehicle, two sets of ground engaging track wheels, each set being carried by one of said endless belts, said endless belts and their supported track wheels comprising top and bottom wheel lays, the wheels being carried for free rotation upon horizontal axles attached in spaced relationship to the flat faces of the belts and having portions protruding from the side edges of the belts and upon which portions the wheels are freely mounted, longitudinal outboard members protruding from and extending lengthwise of the sides of the vehicle body and having lower faces bearing in frictional contact upon the top portions of the bottom wheel lays and whereby the outboard members and the vehicle body are supported by the bottom wheel lays, rotation of the endless belts exerting a pulling force along the axles of the bottom wheel lays whereby frictional contact of the wheels of the bottom lays with the ground surface and with said lower faces of the outboard members rotates the wheels to impart movement to the vehicle body.

2. Means for supporting and imparting movement to a vehicle body as defined in claim 1, wherein the lower faces of the outboard members are buoyant resilient cushions.

3. Means for supporting and imparting movement to a vehicle body as defined in claim 1, wherein the wheels are positioned alongside the outside edges of the endless belts, the outboard members being of sufficient width to extend from the vehicle body and overlie the widths of the belts in combination with the widths of the wheels.

4. Means for supporting and imparting movement to a vehicle body as defined in claim 3, wherein the wheel axles are replaced by yoke members within which the wheels are mounted for free rotation, a pintle carried by each yoke member in parallel relation to the axis of its wheel, the yoke members and wheels being positioned alongside the edges of the belts and the pintles turnably mounted upon the faces of the belts to support the yoke members and to permit the yoke members and wheels to have vertical swinging movement relatively to the horizontal paths of movement of the belts.

5. Means for supporting and imparting movement to a vehicle body as defined in claim 3 wherein four sets of ground engaging track wheels are provided, each endless belt carrying two set of track wheels, one set being positioned alongside the outside edge of the belt and the other set positioned alongside the inside edge of the belt, each outboard member being of sufficient width to extend from the vehicle body a sufficient distance to overlie the combined widths of a belt and the said two sets of wheels carried by the belt.

6. Means for supporting and imparting movement to a vehicle body as defined in claim 3, wherein two pairs of similar endless horizontal belts are provided, two sets of pulleys upon a side of the vehicle body carrying a pair of belts arranged in parallel spaced apart relationship, each pair of belts carrying three sets of track wheels, one set being positioned between the opposite edges of the pair of belts and the other sets positioned alongside the outer edges of the pair of belts, each outboard member being of sufficient width to extend from the vehicle body a sufficient distance to overlie the combined widths of the two belts and the said three sets of wheels carried by the belts.

7. Means for supporting and imparting movement to a vehicle body as defined in claim 3, wherein the portions of the endless belts when in position carrying the lower wheel lays are located below the under face of the vehicle body.

References Cited in the file of this patent

UNITED STATES PATENTS 2,916,006    Crandall ---------------- Dec. 8, 1959